United States Patent
Inagaki et al.

(10) Patent No.: US 12,556,102 B2
(45) Date of Patent: Feb. 17, 2026

(54) POWER SUPPLY APPARATUS AND IMAGE FORMING APPARATUS

(71) Applicant: CANON KABUSHIKI KAISHA, Tokyo (JP)

(72) Inventors: Masaki Inagaki, Shizuoka (JP); Junya Kobayashi, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 354 days.

(21) Appl. No.: 18/324,868

(22) Filed: May 26, 2023

(65) Prior Publication Data

US 2023/0396175 A1   Dec. 7, 2023

(30) Foreign Application Priority Data

Jun. 2, 2022   (JP) ................................. 2022-090064

(51) Int. Cl.
*H02M 3/335*   (2006.01)
*G03G 15/00*   (2006.01)
*H02M 1/00*   (2006.01)

(52) U.S. Cl.
CPC .... *H02M 3/33569* (2013.01); *G03G 15/5004* (2013.01); *H02M 1/0009* (2021.05)

(58) Field of Classification Search
CPC ........... H02M 3/33569; H02M 1/0009; H02M 3/33571; H02M 1/322; H02M 1/342; H02M 1/36; H02M 1/0006; H02M 1/0064; H02M 3/01; G03G 15/5004
See application file for complete search history.

(56) References Cited

U.S. PATENT DOCUMENTS

| | | | |
|---|---|---|---|
| 9,966,865 B2 * | 5/2018 | Shimura | H02M 3/33571 |
| 10,720,845 B2 * | 7/2020 | Shimura | H02M 1/32 |
| 2017/0005585 A1 * | 1/2017 | Shimura | G03G 15/80 |
| 2017/0176919 A1 * | 6/2017 | Asano | G03G 15/80 |
| 2019/0058387 A1 * | 2/2019 | Shimura | H02M 1/08 |
| 2019/0260295 A1 * | 8/2019 | Shimura | H02M 3/33507 |

FOREIGN PATENT DOCUMENTS

| | | |
|---|---|---|
| JP | 2012139100 A | 7/2012 |
| JP | 2013188058 A | 9/2013 |
| JP | 2017112797 A | 6/2017 |
| JP | 6679298 B2 | 4/2020 |

* cited by examiner

*Primary Examiner* — Kyle J Moody
(74) *Attorney, Agent, or Firm* — Canon U.S.A., Inc., IP Division

(57) ABSTRACT

A power supply apparatus includes a transformer including primary and secondary windings, a first switching element connected to the primary winding in series, a second switching element connected to the primary winding in parallel, a first capacitor connected to the second switching element in series, and connected to the primary winding in parallel together with the second switching element, and a control unit that controls a switching operation by making each of the first and second switching elements conductive or non-conductive. The control unit makes the first and second switching elements conductive alternately to generate an output voltage to be output to a secondary side of the transformer. During a period after stopping generation of the output voltage and before resuming the generation of the output voltage, the control unit performs the switching operation of the second switching element in a state where the first switching element is made non-conductive.

15 Claims, 7 Drawing Sheets

POWER SUPPLY APPARATUS AND IMAGE FORMING APPARATUS

BACKGROUND

Field

The present disclosure relates to a power supply apparatus and an image forming apparatus, and to a switching control method in deactivation or activation of a switching power supply of an active clamp type.

Description of the Related Art

In a switching power supply that converts an alternating-current voltage of a power supply such as a commercial power supply into a direct-current voltage, an active clamp method is used as discussed in Japanese Patent No. 6679298. The switching power supply is mounted in, for example, an image forming apparatus.

In a conventional switching power supply, while field effect transistors (FETs) 1 and 2 serving as switching elements are alternately turned on and off repeatedly, a voltage proportional to the voltage of both ends of a smoothing capacitor on the secondary side is applied to a capacitor connected to the FET 2 in series. When the switching of the FET 1 and the FET 2 is halted to stop output, the FET 2 is turned off, so that the charges of the capacitor connected to the FET 2 in series remain. When the power supply is reactivated in this state and the switching of the FET 1 and the FET 2 is resumed, the charges of the capacitor connected to the FET 2 in series flow via the FET 2 at the timing when the FET 2 is turned on, so that an excessive current flows through the FET 2. For this reason, it is necessary to raise the current rating of the FET 2, which increases the cost.

SUMMARY

Various embodiments of the present disclosure are directed to reducing a cost attributable to a switching element by suppressing a peak value of a current flowing through the switching element at the time of activation of a power supply apparatus.

According to an aspect of the present disclosure, a power supply apparatus includes a transformer including a primary winding and a secondary winding, a first switching element connected to the primary winding in series, a second switching element connected to the primary winding in parallel, a first capacitor connected to the second switching element in series, and connected to the primary winding in parallel together with the second switching element, and a control unit configured to control a switching operation of each of the first switching element and the second switching element by making each of the first switching element and the second switching element conductive or non-conductive. The control unit makes the first switching element and the second switching element conductive alternately to generate an output voltage to be output to a secondary side of the transformer. During a period after stopping generation of the output voltage and before resuming the generation of the output voltage, the control unit performs the switching operation of the second switching element in a state where the first switching element is made non-conductive.

According to another aspect of the present disclosure, a power supply apparatus includes a transformer including a primary winding and a secondary winding, a first switching element connected to the primary winding in series, a second switching element connected to the primary winding in parallel, a first capacitor connected to the second switching element in series, and connected to the primary winding in parallel together with the second switching element, and a control unit configured to control a switching operation of each of the first switching element and the second switching element by making each of the first switching element and the second switching element conductive or non-conductive. The control unit makes the first switching element and the second switching element conductive alternately to generate an output voltage to be output to a secondary side of the transformer. Before starting generation of the output voltage, the control unit performs the switching operation of the second switching element by making the second switching element conductive for a period shorter than a period in which the second switching element is made conductive to generate the output voltage.

According to yet another aspect of the present disclosure, an image forming apparatus includes a power supply apparatus including a transformer including a primary winding and a secondary winding, a first switching element connected to the primary winding in series, a second switching element connected to the primary winding in parallel, a first capacitor connected to the second switching element in series, and connected to the primary winding in parallel together with the second switching element, and a control unit configured to control a switching operation of each of the first switching element and the second switching element by making each of the first switching element and the second switching element conductive or non-conductive. The control unit makes the first switching element and the second switching element conductive alternately to generate an output voltage to be output to a secondary side of the transformer. During a period after stopping generation of the output voltage and before resuming the generation of the output voltage, the control unit performs the switching operation of the second switching element in a state where the first switching element is made non-conductive.

According to yet another aspect of the present disclosure, an image forming apparatus includes a power supply apparatus including a transformer including a primary winding and a secondary winding, a first switching element connected to the primary winding in series, a second switching element connected to the primary winding in parallel, a first capacitor connected to the second switching element in series, and connected to the primary winding in parallel together with the second switching element, and a control unit configured to control a switching operation of each of the first switching element and the second switching element by making each of the first switching element and the second switching element conductive or non-conductive. The control unit makes the first switching element and the second switching element conductive alternately to generate an output voltage to be output to a secondary side of the transformer. Before starting generation of the output voltage, the control unit performs the switching operation of the second switching element by making the second switching element conductive for a period shorter than a period in which the second switching element is made conductive to generate the output voltage.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to the drawings.
<Configuration of Power Supply Apparatus>

Figure 1:
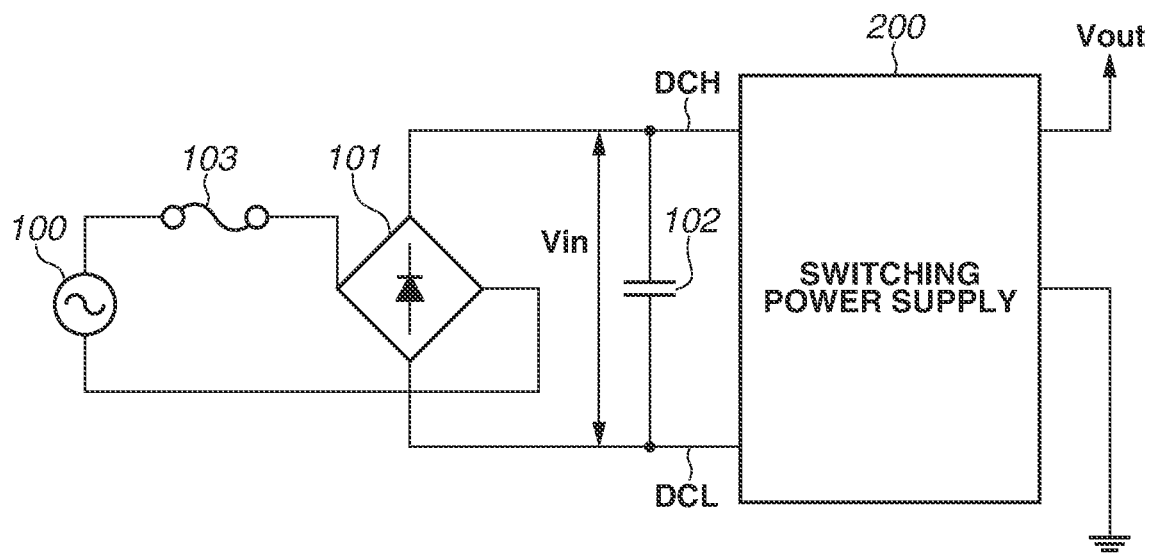
FIG. 1 is a circuit diagram illustrating a power supply apparatus according to first to third exemplary embodiments.

FIG. 1 illustrates a schematic configuration of a power supply apparatus according to a first exemplary embodiment. As illustrated in FIG. 1, the power supply apparatus includes a rectification smoothing unit for rectifying and smoothing an alternating-current voltage input from an alternating-current power supply 100, and a switching power supply 200. The rectification smoothing unit includes a diode bridge 101 and a smoothing capacitor 102. The alternating-current voltage input from the alternating-current power supply 100 is subjected to full-wave rectification via a current fuse 103 for circuit protection and the diode bridge 101, and smoothed by the smoothing capacitor 102 serving as a second capacitor, so that a direct-current voltage Vin is generated. A low-side potential of the smoothing capacitor 102 is defined as a potential DCL, and a high-side potential of the smoothing capacitor 102 is defined as a potential DCH. The direct-current voltage Vin is input to the switching power supply 200, and the input direct-current voltage Vin is lowered in the switching power supply 200, so that an output voltage Vout, which is a direct-current voltage, is output.
<Configuration of Switching Power Supply>

Figure 2:
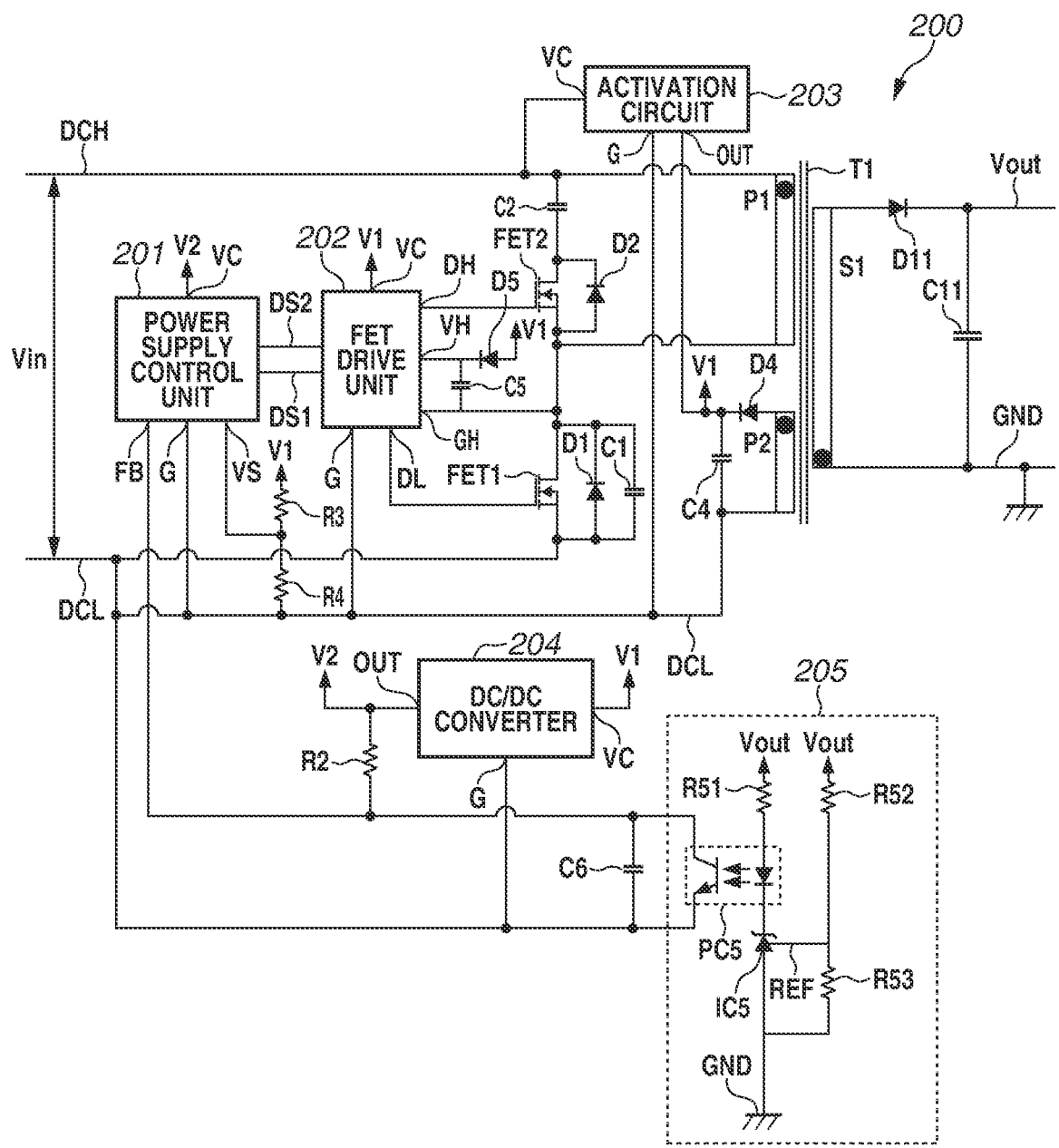
FIG. 2 is a circuit diagram illustrating an active clamp flyback power supply according to the first to third exemplary embodiments.

FIG. 2 is a circuit diagram illustrating a circuit configuration of the switching power supply 200. Referring to FIG. 2, the switching power supply 200 includes a transformer T1 of an insulation type. The transformer T1 includes a primary winding P1 and an auxiliary winding P2 on the primary side, and a secondary winding S1 on the secondary side. Energy is supplied from the primary winding P1 to the secondary winding S1 of the transformer T1 by switching control (described below). In the auxiliary winding P2 of the transformer T1, a voltage (a forward voltage) that has a value of NP2/NP1×Vin during an on-period of a switching operation is induced, where NP1 represents the number of turns of the primary winding P1, and NP2 represents the number of turns of the auxiliary winding P2. The voltage induced in the auxiliary winding P2 is rectified and smoothed by a diode D4 and a capacitor C4 that form a rectification smoothing unit, so that a power supply voltage V1 is generated.

The primary side of the switching power supply 200 includes a field effect transistor (FET) 1 connected to the primary winding P1 in series, and a series circuit connected to the primary winding P1 in parallel. The series circuit is a circuit in which a capacitor C2 for voltage clamp, which is a first capacitor, and an FET 2 are connected in series. The capacitor C2 is connected to the FET 2 in series, and connected to the primary winding P1 in parallel together with the FET 2. A capacitor C1 for voltage resonance connected to the FET 1 in parallel is provided to reduce a loss during an off-period of the switching operation of the FET 1 serving as a first switching element and the FET 2 serving as a second switching element. In place of the capacitor C1 for voltage resonance, a capacitance between a drain terminal and a source terminal of the FET 1 can be used. Diodes D1 and D2 are a body diode of the FET 1 and a body diode of the FET 2, respectively. On the secondary side of the switching power supply 200, a diode D11 and a capacitor C11 are provided as a secondary side rectification smoothing unit for rectifying and smoothing a flyback voltage that occurs in the secondary winding S1.
<Feedback Unit>

The switching power supply 200 includes a feedback unit 205 for feeding back, to the primary side of the transformer T1, voltage information about the output voltage Vout output to a load connected to the secondary side. The feedback unit 205 generates a voltage signal (hereinafter referred to as a feedback (FB) terminal voltage) to be input to a FB terminal of a power supply control unit 201, based on a target voltage and the output voltage Vout. The feedback unit 205 includes a shunt regulator IC5, a photocoupler PC5, and resistances R51, R52, and R53. The target voltage of the output voltage Vout is set based on a reference voltage of a reference terminal REF of the shunt regulator IC5 and the resistances R52 and R53.

The FB terminal voltage is generated by charging a capacitor C6 using a power supply voltage V2 and a resistance R2, and discharging the capacitor C6 using the feedback unit 205. The capacitor C6 is discharged while the photocoupler PC5 of the feedback unit 205 is in a conductive state, and is charged while the photocoupler PC5 is in a non-conductive state. In a case where the output voltage Vout is identical to the target voltage, the FB terminal voltage is a predetermined voltage value. The FB terminal voltage is small when the output voltage Vout is higher than the target voltage, and is large when the output voltage Vout is lower than the target voltage.
<Configuration of Power Supply Control Unit>

In the present exemplary embodiment, a calculation control unit (e.g., a central processing unit (CPU) or an application specific integrated circuit (ASIC)) that operates based on a clock signal from an oscillator is used for the power supply control unit 201. The power supply control unit 201 includes a timer (not illustrated) that measures a time, and a storage unit (not illustrated) such as a memory that stores data.

The power supply control unit 201 serves as a control unit that controls conduction and non-conduction of the FET 1 and the FET 2. More specifically, the power supply control unit 201 controls the FET 1 and the FET 2 via an FET drive unit 202 serving as a drive unit that drives the FET 1 and the FET 2. The power supply control unit 201 controls the switching operation of the FET 1 and the FET 2 by making the FET 1 and the FET 2 conductive alternately, thereby generating the output voltage Vout to be output to the secondary side of the transformer T1. The power supply voltage V2 is generated by a direct current-to-direct current (DC/DC) converter 204 and supplied to a VC terminal of the power supply control unit 201. A G terminal of the power supply control unit 201 is connected to the potential DCL. The power supply control unit 201 outputs a control signal DS1 for driving the FET 1 and a control signal DS2 for driving the FET 2, based on the FB terminal voltage and a VS terminal voltage (described below). Each of the control signal DS1 and the control signal DS2 is output as a pulse width modulation (PWM) signal with predetermined frequency and on-duty ratio (described below). The control signal DS1 and the control signal DS2 will be described below.

The VS terminal voltage is a voltage obtained by dividing the power supply voltage V1 using a resistance R3 that is a first resistance and a resistance R4 that is a second resistance. Upon detecting the VS terminal voltage, the power supply control unit 201 can predict the direct-current voltage Vin and the voltage of the alternating-current power supply 100, based on the division ratio between the resistance R3 and the resistance R4 and information about the winding ratio between the number of turns NP1 of the primary winding P1 and the number of turns NP2 of the auxiliary winding P2 of the transformer T1.

<FET Drive Unit, DC/DC Converter, and Activation Circuit>

The FET drive unit 202 is a circuit that generates a gate drive signal DL for the FET 1 based on the control signal DS1, and also generates a gate drive signal DH for the FET 2 based on the control signal DS2. The power supply voltage V1 is supplied between a VC terminal and a G terminal of the FET drive unit 202. The power supply voltage V1 is also supplied between a VH terminal and a GH terminal of the FET drive unit 202 by a charge pump circuit including a capacitor C5 and a diode D5, in order to drive the FET 2. When the control signal DS1 becomes a high-level state, the FET drive unit 202 changes the gate drive signal DL for the FET 1 to a high-level state, so that the FET 1 becomes an on-state. Similarly, when the control signal DS2 becomes a high-level state, the FET drive unit 202 changes the gate drive signal DH for the FET 2 to a high-level state, so that the FET 2 becomes an on-state.

The DC/DC converter 204, which is a three-terminal regulator or a step-down switching power supply, generates the power supply voltage V2 from the power supply voltage V1 input to a VC terminal thereof, and outputs the generated power supply voltage V2 from an OUT terminal thereof. A G terminal of the DC/DC converter 204 is connected to the potential DCL.

An activation circuit 203, which is a three-terminal regulator or a step-down switching power supply, generates the power supply voltage V1 from the direct-current voltage Vin input to a VC terminal thereof, and outputs the generated power supply voltage V1 from an OUT terminal thereof. A G terminal of the activation circuit 203 is connected to the potential DCL. The activation circuit 203 operates only in a case where the power supply voltage V1 generated from the voltage induced in the auxiliary winding P2 is equal to or less than a predetermined voltage value, and is used to supply the power supply voltage V1 at the time of activation of the switching power supply 200.

<Control by Power Supply Control Unit>

Figure 3:
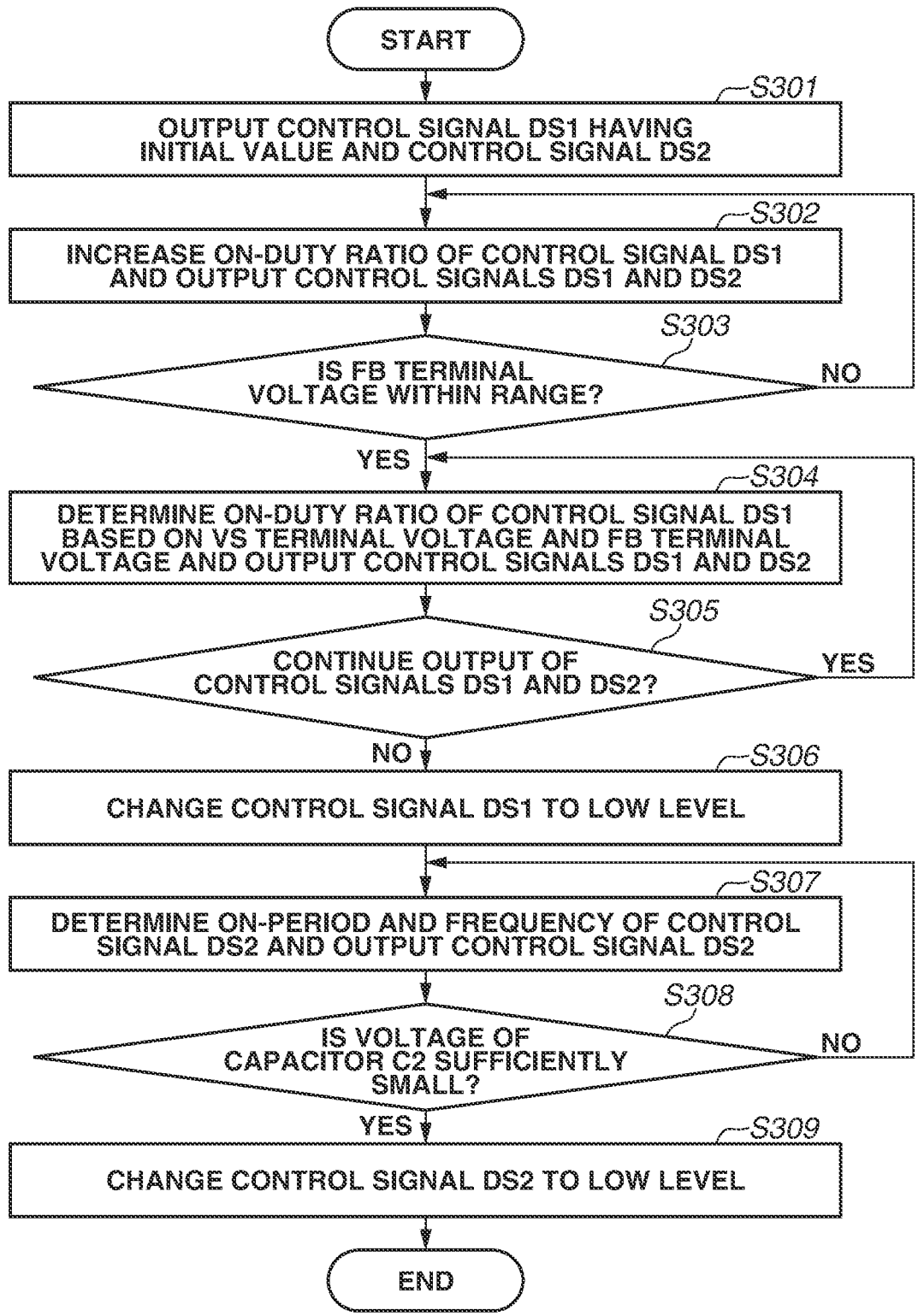
FIG. 3 is a flowchart illustrating switching control according to the first exemplary embodiment.

FIG. 3 is a flowchart illustrating control performed by the power supply control unit 201 according to the present exemplary embodiment. When the direct-current voltage Vin is supplied to the switching power supply 200, the power supply control unit 201 starts the control in step S301 and the subsequent steps. In step S301, the power supply control unit 201 sets the control signal DS1 to an initial value as a predetermined initial condition, and outputs the control signal DS1 as the PWM signal. The initial value of the control signal DS1 can be stored, for example, in the above-described storage unit (not illustrated). In this step, the control signal DS2 is output to be on during an off-period of the control signal DS1, during which a dead time is provided, and to be off during the other period. The dead time is a period during which both the control signal DS1 and the control signal DS2 are off (at a low level). Thus, during the dead time, the FET 1 and the FET 2 are both in an off-state (a non-conductive state).

In step S302, the power supply control unit 201 increases an on-duty ratio of the control signal DS1 (the gate drive signal DL) from the initial value to prevent an overshoot of the output voltage Vout, and outputs the PWM signals. The on-duty ratio is the ratio of the high level in one cycle of the PWM signal. Alternatively, the control signal DS1 can be controlled based on the off-duty ratio that is the ratio of the low level in one cycle of the PWM signal. In step S303, the power supply control unit 201 determines whether the FB terminal voltage is within a predetermined range. In a case where the power supply control unit 201 determines that the FB terminal voltage is not within the predetermined range (NO in step S303), the processing returns to step S302. In a case where the power supply control unit 201 determines that the FB terminal voltage is within the predetermined range (YES in step S303), the processing proceeds to step S304. In this way, the power supply control unit 201 gradually increases the on-duty ratio from the initial condition (the initial value), whereby the output voltage Vout can be safely increased to the target voltage. The control signal DS2 (the gate drive signal DH) is output to be on during the off-period of the control signal DS1, during which the dead time is provided, and to be off during the other period. In other words, the control signal DS2 is controlled based on the control signal DS1. In a case where the FB terminal voltage is determined to be within the predetermined range in step S303, the power supply control unit 201 determines that the output voltage Vout has reached the target voltage, and the processing proceeds to step S304.

In step S304, the power supply control unit 201 determines the on-duty ratio of the control signal DS1 based on the VS terminal voltage and the FB terminal voltage, and outputs the PWM signal. The power supply control unit 201 outputs the control signal DS2 so as to be on during the off-period of the control signal DS1, during which the dead time is provided, and so as to be off during the other period. In other words, the control signal DS2 is controlled based on the control signal DS1. The power supply control unit 201 can thereby keep the output voltage Vout at a constant level even through the load of the direct-current voltage Vin or the output voltage Vout has changed. The details of the operation will be described below.

In step S305, the power supply control unit 201 determines whether to continue the output of the PWM signals of the control signals DS1 and DS2 determined in step S304. In a case where the power supply control unit 201 determines not to continue the output of the PWM signals (NO in step S305), the processing proceeds to step S306. In a case where the power supply control unit 201 determines to continue the output of the PWM signals (YES in step S305), the processing returns to step S304. In the present exemplary embodiment, to prevent the control signals DS1 and DS2 from being output as the PWM signals in a state where the direct-current voltage Vin is equal to or less than a predetermined voltage, the processing proceeds to step S306 in a case where the power supply control unit 201 detects the VS terminal voltage as being equal to or less than a predetermined voltage. Examples of the cause of the state where the direct-current voltage Vin is equal to or less than the predetermined voltage, i.e., the state where the VS terminal voltage is equal to or less than the predetermined voltage include power-off of the power supply apparatus and a power failure.

In step S306, the power supply control unit 201 changes the control signal DS1 to the low level, thereby stopping the switching operation of the FET 1. In step S307, the power supply control unit 201 determines the on-period and frequency of the control signal DS2, and outputs the PWM signal. The details will be described below. In step S308, the power supply control unit 201 determines whether the voltage of the capacitor C2 for voltage clamp is smaller than a predetermined voltage (or sufficiently small). In the present exemplary embodiment, the power supply control unit 201 determines whether the voltage of the capacitor C2 is equal to or less than the predetermined voltage, based on whether the control signal DS2 is output as the PWM signal a predetermined number of times, and based on a relationship between the number of outputs of the PWM signal and the voltage of the capacitor C2 that is determined beforehand by experiment. Information (e.g., a table) indicating the relationship between the number of outputs of the PWM signal and the voltage of the capacitor C2 can be stored beforehand in the above-described storage unit. The power supply control unit 201 can determine that the voltage of the capacitor C2 is equal to or less than the predetermined voltage, based on the information read out from the storage unit and the number of outputs of the PWM signal. The power supply control unit 201 can count the number of outputs of the PWM signal using a counter (not illustrated). In a case where the power supply control unit 201 determines that the capacitor C2 is not equal to or less than the predetermined voltage (NO in step S308), the processing returns to step S307. In a case where the power supply control unit 201 determines that the capacitor C2 is equal to or less than the predetermined voltage (YES in step S308), the processing proceeds to step S309.

In step S309, the power supply control unit 201 changes the control signal DS2 to the low level, thereby turning off the switching operation of the FET 2, so that the switching power supply 200 is deactivated. After the deactivation of the switching power supply 200, the power supply control unit 201 resumes the operation from step S301 when the input of the direct-current voltage Vin begins upon, for example, recovery from a power failure.

<Timing Chart of Control by Power Supply Control Unit>

Figure 4:
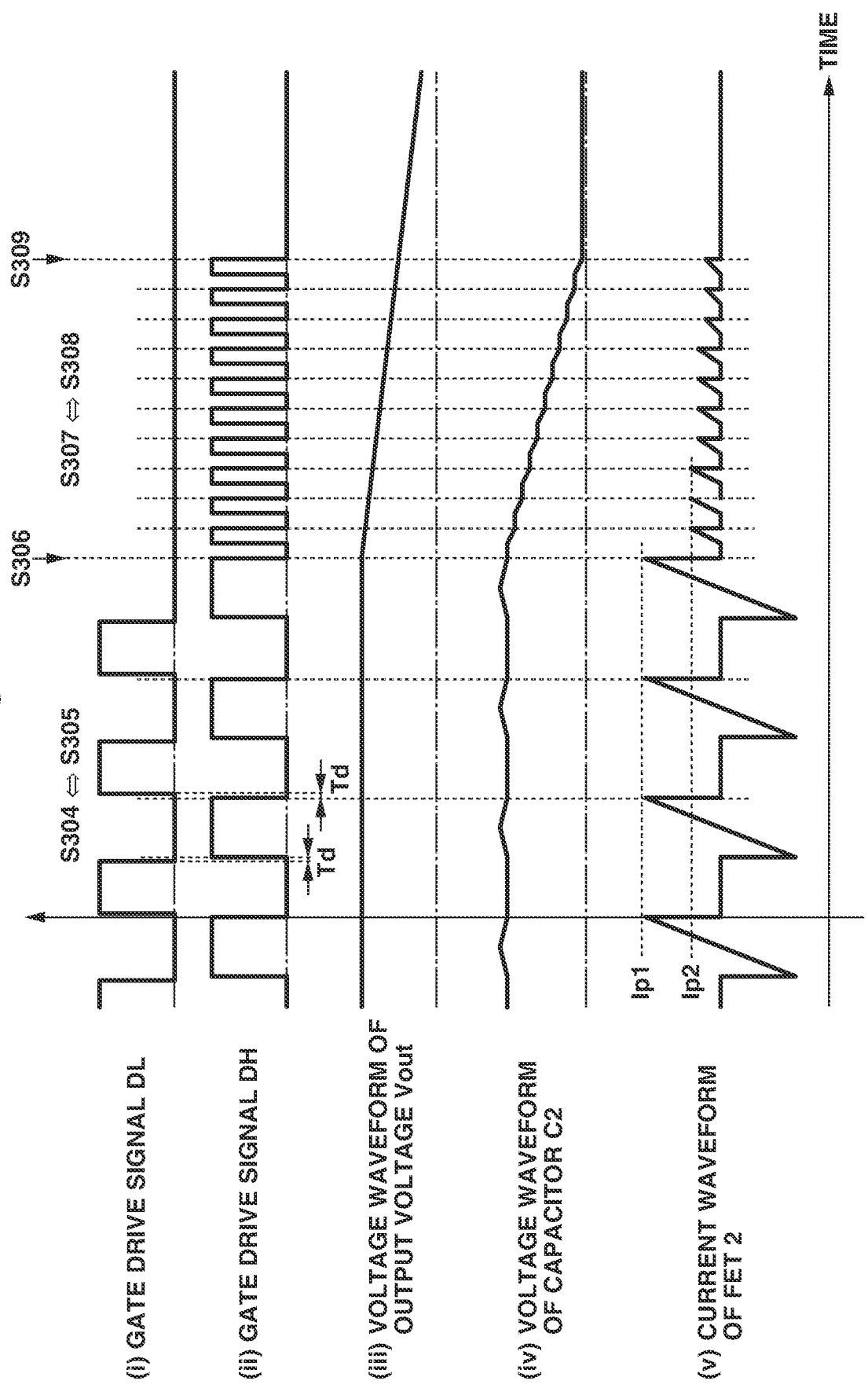
FIG. 4 is a schematic diagram illustrating waveforms in the switching control according to the first exemplary embodiment.

FIG. 4 illustrates (i) the gate drive signal DL, (ii) the gate drive signal DH, and (iii) a voltage waveform of the output voltage Vout, in the processing of steps S304 to S309 performed by the power supply control unit 201 in FIG. 3. FIG. 4 also illustrates (iv) a voltage waveform of the capacitor C2, and (v) a current waveform of the FET 2. FIG. 4 indicates time on the horizontal axis. In FIG. 4, step numbers such as "S304" correspond to the step numbers in FIG. 3. In (iv) the voltage waveform of the capacitor C2, a waveform in a case where the potential DCH is used as a reference is illustrated. In (v) the current waveform of the FET 2, a current flowing in a direction from the capacitor C2 to the FET 2 is positive, i.e., a direction in which the current of the capacitor C2 is released is positive.

In step S304, the gate drive signal DH and the gate drive signal DL are output as the PWM signals based on the control signal DS1 and the control signal DS2. The gate drive signal DL is output with the same on-duty ratio and frequency as those of the control signal DS1. The gate drive signal DH is output to be on during the off-period of the gate drive signal DL, during which the dead time (indicated by Td in FIG. 4) is provided, and to be off during the other period.

When the gate drive signal DL becomes the high level, energy is stored in the transformer T1.

When the gate drive signal DL becomes the low level, the energy stored in the transformer T1 flows through the capacitor C2 via the diode D2. Thus, the voltage of the capacitor C2 increases.

When the gate drive signal DH becomes the high level after the dead time, the current flowing via the diode D2 flows via the FET 2. While the gate drive signal DH is at the high level, the charge and the discharge are performed by the resonance of the capacitor C2 and the transformer T1, and thus the voltage of the capacitor C2 decreases after increasing. The current of the FET 2 also gradually decreases, and the current discharged from the capacitor C2 flows. During this period, energy is stored in the output voltage Vout, and the output voltage Vout is kept at a constant level.

When the gate drive signal DH becomes the low level, the voltage of the capacitor C2 becomes constant and the current of the FET 2 becomes zero. When the gate drive signal DL becomes the high level again after the dead time, energy is stored in the transformer T1. The above-described control (in steps S304 and S305) is repeated until the determination condition is satisfied in step S305 in FIG. 3.

If the determination condition is satisfied in step S305, then in step S306, the gate drive signal DL is fixed to the low level. This stops the storage of the energy in the transformer T1, thereby stopping the energy supply to the secondary side, so that the output voltage Vout is consumed by the connected load and gradually decreases. The energy supply to the capacitor C2 also stops, and thus the charges of the capacitor C2 decrease.

In step S307, the gate drive signal DL remains at the low level, and the gate drive signal DH is output with predetermined on-period and frequency. In the present exemplary embodiment, the gate drive signal DH is output as the PWM signal with a frequency faster (higher) than that of the PWM signal output in step S304. At this time, energy is not supplied to the capacitor C2. Thus, the charges leave the capacitor C2 while the gate drive signal DH is at the high level. While the gate drive signal DH is at the high level, the current of the FET 2 flows to decrease the voltage of the capacitor C2, so that the voltage of the capacitor C2 decreases. It is also possible to discharge the charges of the capacitor C2 while lowering the current peak of the FET 2, by reducing the high-level period of the PWM signal of the gate drive signal DH to reduce the on-period of the FET 2.

Referring to FIG. 4, the current peak value of the gate drive signal DH is Ip1 in step S304, whereas the current peak value is Ip2 smaller than Ip1 (Ip2<Ip1) in and after step S306. In the present exemplary embodiment, the frequency of the PWM signal is increased to reduce the high-level period of the gate drive signal DH. Alternatively, the on-duty ratio can be decreased to reduce the high-level period of the gate drive signal DH. As for (ii) the gate drive signal DH illustrated in FIG. 4, the power supply control unit 201 turns on and off the FET 2 multiple times, but the on-off switching operation is performed at least twice in the present exemplary embodiment.

In step S308, the gate drive signal DH is output a predetermined number of times, and subsequently in step S309, the gate drive signal DH is fixed to the low level, so that the switching power supply 200 is deactivated. The output voltage Vout decreases because of the connected load. After the deactivation of the switching power supply 200, the operation resumes from step S301 when the input of the direct-current voltage Vin begins upon, for example, recovery from a power failure. Such control can sufficiently reduce the voltage of the capacitor C2 at the time of deactivation of the switching power supply 200.

If the switching power supply 200 is deactivated while the voltage of the capacitor C2 is high, and the operation resumes, a large current flows from the capacitor C2 to the transformer T1 through the FET 2 when the gate drive signal DH becomes the high level in step S301. This raises the need to select an FET with a large current rating as the FET 2. In contrast, the control according to the present exemplary embodiment lowers the voltage of the capacitor C2 beforehand at the time of deactivation of the switching power supply 200, so that the current flowing through the FET 2 is reduced. As a result, an FET with a low current rating can be used as the FET 2 and the cost of the FET 2 can be reduced.

The power supply control unit 201 is configured to control the switching operation of the FET 2 in a state where the FET 1 is non-conductive, during the period after stopping the generation of the output voltage Vout and before resuming the generation of the output voltage Vout. The power supply control unit 201 makes the FET 2 conductive at least twice during the period after stopping the generation of the output voltage Vout and before resuming the generation of the output voltage Vout. The power supply control unit 201 makes the period during which the FET 2 is made conductive after the generation of the output voltage Vout is stopped, shorter than the period during which the FET 2 is made conductive before the generation of the output voltage Vout is stopped. The power supply control unit 201 can make the frequency of the switching operation of the FET 2 after stopping the generation of the output voltage Vout, higher than the frequency of the switching operation of the FET 2 before stopping the generation of the output voltage Vout.

In the present exemplary embodiment, in step S308, the power supply control unit 201 determines that the voltage of the capacitor C2 is smaller than the predetermined voltage by determining whether the control signal DS2 is output the predetermined number of times. The present exemplary embodiment is, however, not limited thereto. For example, a voltage detection circuit that detects the voltage of the capacitor C2 can be provided and, based on the result of the detection by the voltage detection circuit, the power supply control unit 201 can determine that the voltage of the capacitor C2 is smaller than the predetermined voltage. Alternatively, a current detection circuit that detects a current flowing through the capacitor C2 can be provided utilizing the correlation between the voltage of the capacitor C2 and a discharge current amount. Based on the result of the detection by the current detection circuit, the power supply control unit 201 can determine that the voltage of the capacitor C2 is smaller than the predetermined voltage by monitoring a change in the discharge current amount. This makes it possible to detect the remaining charges of the capacitor C2 and thereby bring the remaining charges close to zero. As a result, the current flowing through the FET 2 can be reduced, and a malfunction can be prevented.

In the present exemplary embodiment, in step S307, the control signal DS2 is output at a frequency faster (higher) than the frequency of the PWM signal in step S304, but the present exemplary embodiment is not limited thereto. For example, the on-period of the FET 2 can be reduced by reducing the high-level period of the control signal DS2. For example, the on-period of the FET 2 can be reduced by reducing the high-level period of the control signal DS2 at the same frequency.

In the present exemplary embodiment, the control signal DS2 is output as the fixed PWM signal in step S307, but the present exemplary embodiment is not limited thereto. For example, a voltage detection circuit that detects the voltage of the capacitor C2 can be provided and, based on the detected voltage, the power supply control unit 201 can change the high-level period or frequency of the PWM signal. The current of the FET 2 changes depending on the voltage of the capacitor C2, and thus the control signal DS2 can be optimized for each voltage of the capacitor C2 in a range not exceeding the current rating of the FET 2. As a result, the voltage of the capacitor C2 can be lowered fast and safely.

The power supply control unit 201 can change the high-level period or frequency of the PWM signal of the control signal DS2, based on the VS terminal voltage. The charges stored in the capacitor C2 return to the smoothing capacitor 102 via the transformer T1 in step S307. If the direct-current voltages Vin vary, the discharge periods of the capacitor C2 vary. It is thus possible to lower the voltage of the capacitor C2 fast in a range not exceeding the current rating of the FET 2 by detecting the VS terminal voltage and changing the control signal DS2 based on the detected VS terminal voltage.

The determination that the voltage of the capacitor C2 is sufficiently small, i.e., equal to or less than the predetermined voltage can be made as follows. A storage unit that stores information indicating the relationship between the number of times of the switching operation of the FET 2 and the voltage of the capacitor C2 is provided, and the power supply control unit 201 determines the voltage of the capacitor C2 based on the information stored in the storage unit and the number of times of the switching operation of the FET 2. Subsequently, the power supply control unit 201 controls the switching operation of the FET 2 until the determined voltage of the capacitor C2 becomes equal to or less than the predetermined voltage.

For example, the switching power supply 200 can include a voltage detection circuit as a first voltage detection unit that detects the voltage of the capacitor C2, and the power supply control unit 201 can control the switching operation of the FET 2 until the detected voltage of the capacitor C2 becomes equal to or less than the predetermined voltage.

For example, the switching power supply 200 can include a current detection circuit as a current detection unit that detects a current flowing when the capacitor C2 is discharged, and the power supply control unit 201 can determine the voltage of the capacitor C2 based on the detected current. The power supply control unit 201 can control the switching operation of the FET 2 until the determined voltage of the capacitor C2 becomes equal to or less than the predetermined voltage.

Further, the switching power supply 200 can include a voltage detection circuit as a second voltage detection unit that detects the voltage of the smoothing capacitor 102, and the power supply control unit 201 can determine the voltage of the capacitor C2 based on the detected voltage. The power supply control unit 201 can control the switching operation of the FET 2 until the determined voltage of the capacitor C2 becomes equal to or less than the predetermined voltage.

In the present exemplary embodiment, the operation of switching the FET 2 while keeping the FET 1 turned off is performed after whether to continue the output of the PWM signals is determined in step S305, but the present exemplary embodiment is not limited thereto. For example, the timing for performing the operation from steps S306 to S308 can be before the next activation of the switching power supply 200. In other words, the voltage of the capacitor C2 is controlled to be lowered before the switching power supply 200 is activated next time.

In this way, according to the present exemplary embodiment, in a case where the switching operation is to be stopped, it is possible to release the charges of the capacitor C2 by controlling the switching of the FET 2 while keeping the FET 1 turned off. When the operation of the power supply apparatus is resumed, the current flowing from the capacitor C2 to the FET 2 is small because the amount of the charges remaining in the capacitor C2 is small. This makes it possible to use a switching FET with a low current rating as the FET 2 and thereby reduce the cost of the FET 2.

As described above, according to the present exemplary embodiment, it is possible to suppress a peak value of a current flowing through a switching element at the time of activation of a power supply apparatus, and thereby reduce a cost attributable to the switching element.

In a second exemplary embodiment, a configuration of a power supply apparatus, a configuration of a switching power supply, a feedback unit, a configuration of a power supply control unit, and an FET drive unit are similar to those in the first exemplary embodiment, and thus the description thereof will be omitted.

<Control by Power Supply Control Unit>

Figure 5:
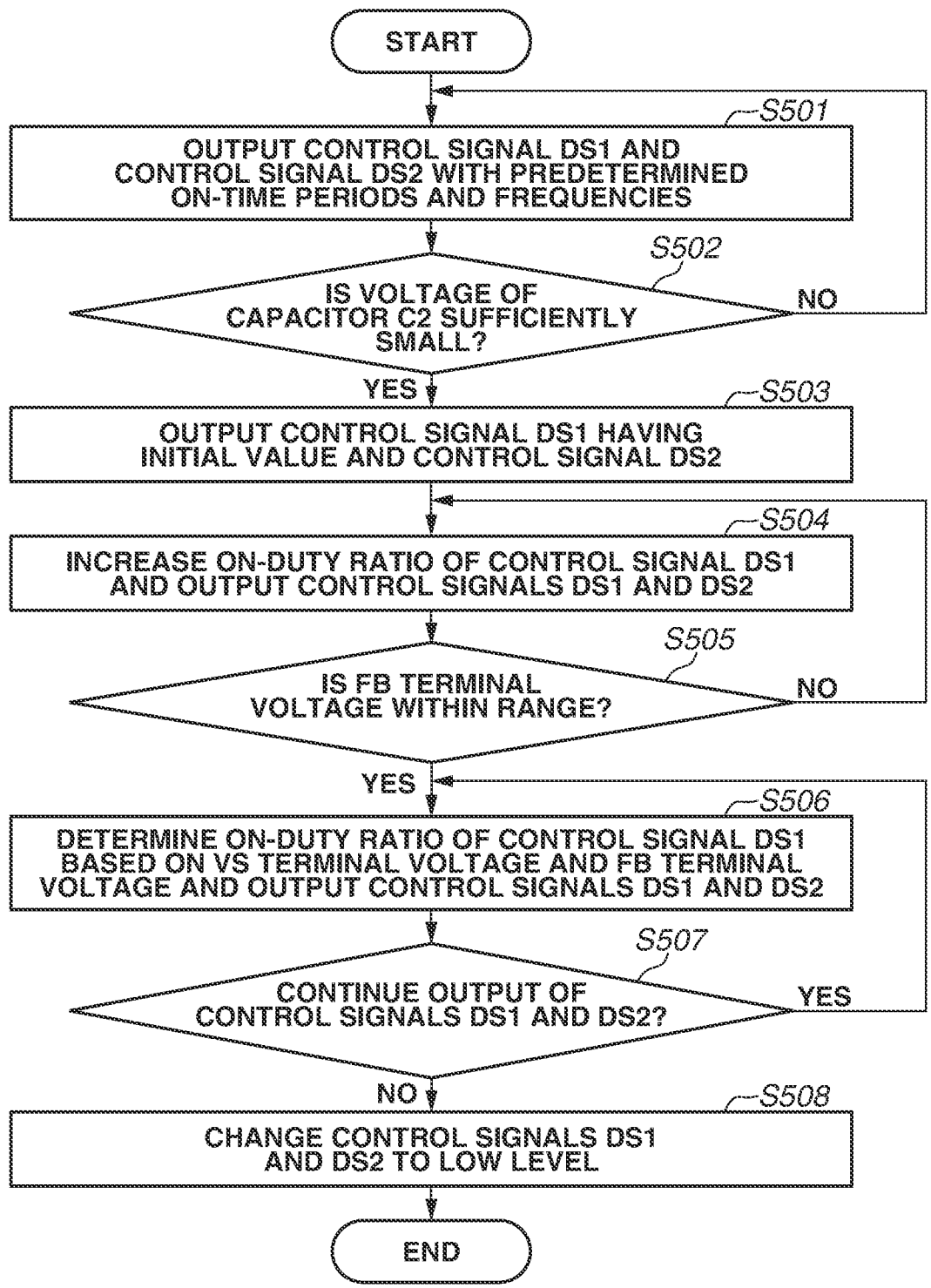
FIG. 5 is a flowchart illustrating switching control according to the second exemplary embodiment.

FIG. 5 is a flowchart illustrating control performed by the power supply control unit 201 according to the present exemplary embodiment. When the direct-current voltage Vin is supplied to the switching power supply 200, the power supply control unit 201 starts the control in and after step S501. In step S501, the power supply control unit 201 outputs the control signal DS1 and the control signal DS2 with predetermined on-periods and frequencies. The details will be described below. In step S502, the power supply control unit 201 determines whether the voltage of the capacitor C2 for voltage clamp is smaller than a predetermined voltage. In the present exemplary embodiment, the power supply control unit 201 determines that the voltage of the capacitor C2 is sufficiently small, based on whether the control signal DS1 and the control signal DS2 are output a predetermined number of times, and based on a relationship between the number of outputs of the PWM signals and the voltage of the capacitor C2 that is determined beforehand by experiment.

In a case where the power supply control unit 201 determines that the capacitor C2 is not smaller than the predetermined voltage (NO in step S502), the processing returns to step S501. In a case where the power supply control unit 201 determines that the capacitor C2 is smaller than the predetermined voltage (YES in step S502), the processing proceeds to step S503. Processing of steps S503 to S508 is similar to the processing of steps S301 to S306 in FIG. 3 described above, and thus the description thereof will be omitted here. In step S508, the power supply control unit 201 stops the switching operation by changing the control signal DS1 and the control signal DS2 to the low level, so that the switching power supply 200 is deactivated. After the deactivation of the switching power supply 200, the operation resumes from step S501 when the input of the direct-current voltage Vin begins upon, for example, recovery from a power failure.

<Timing Chart of Control by Power Supply Control Unit>

Figure 6:
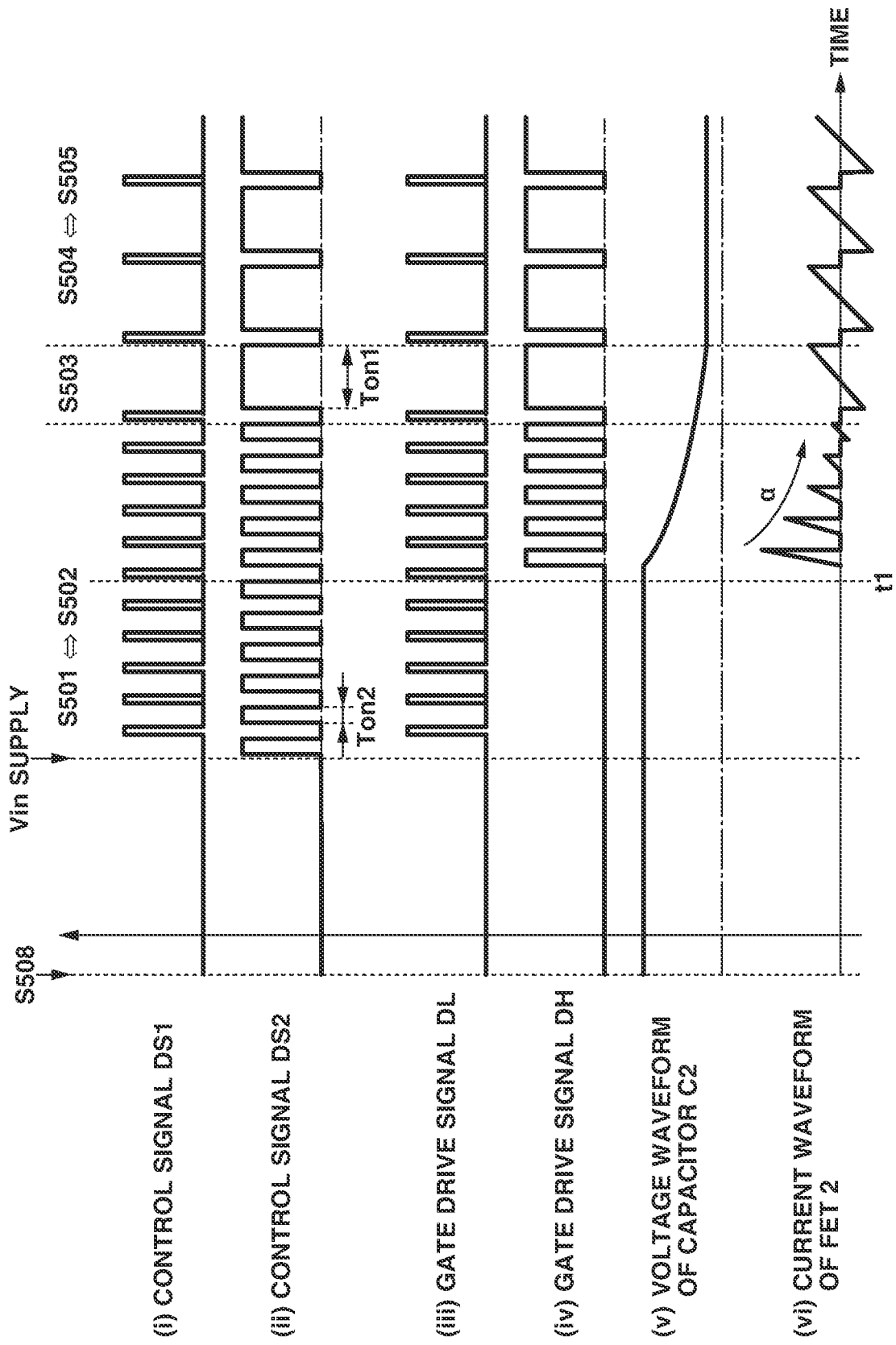
FIG. 6 is a schematic diagram illustrating waveforms in the switching control according to the second exemplary embodiment.

FIG. 6 illustrates (i) the control signal DS1, (ii) the control signal DS2, (iii) the gate drive signal DL, and (iv) the gate drive signal DH in the processing from steps S501 to S505 upon activation of the switching power supply 200 after the deactivation of the switching power supply 200 in step S508 in FIG. 5. FIG. 6 also illustrates (v) a voltage waveform of the capacitor C2 and (vi) a current waveform of the FET 2. In FIG. 6, the horizontal axis indicates time. In (v) the voltage waveform of the capacitor C2, a waveform in a case where the potential DCH is used as a reference is illustrated. In (vi) the current waveform of the FET 2, a current flowing in a direction from the capacitor C2 to the FET 2 is positive. In FIG. 6, step numbers such as "S508" correspond to the step numbers in FIG. 5.

In step S508, the control signal DS1 and the control signal DS2 are at the low level. Thus, the gate drive signal DL and the gate drive signal DH are also at the low level. Since the gate drive signal DH is off, a current does not flow through the FET 2, and the voltage of the capacitor C2 in step S507 is maintained.

The control signal DS1 and the control signal DS2 are kept at the low level until the switching power supply 200 is activated (the direct-current voltage Vin is supplied) next time after the switching power supply 200 is deactivated in step S508, and thus the gate drive signal DL and the gate drive signal DH are also at the low level. In the meantime, the capacitor C2 is not discharged and thus the voltage is maintained. Since the gate drive signal DH is at the low level and the FET 2 is not turned on, a current does not flow through the FET 2.

In step S501, the output of the control signal DS1 and the control signal DS2 as the PWM signals begins, and the output of the PWM signals continues until the determination condition is satisfied in step S502. An on-period Ton2 of the control signal DS2 in this step is shorter than an on-period Ton1 of the control signal DS2 in step S503 to be described below (Ton2<Ton1).

The gate drive signal DL repeats the high level and the low level in a manner similar to the control signal DS1. Meanwhile, the gate drive signal DH is not charged with the voltage of the VH terminal of the FET drive unit 202, and thus is kept at the low level. While the gate drive signal DH is at the low level, the voltage of the capacitor C2 is maintained, and the current of the FET 2 does not flow. In the meantime, each time the gate drive signal DL becomes the low level, the VH terminal is supplied with power from the power supply voltage V1. At a timing t1 when sufficient power is supplied to the VH terminal, the gate drive signal DH is output as the PWM signal based on the control signal DS2. When the gate drive signal DH becomes the high level, the FET 2 flows the current to the transformer T1, so that the voltage of the capacitor C2 decreases. At this time, the control signal DS2 is the PWM signal for which the on-period is reduced. Thus, the current flowing through the FET 2 in one cycle of the PWM signal is reduced, so that the current peak can be suppressed. This makes it possible to use an FET with a small rating as the FET 2 and thereby reduce the cost. Afterward, as the voltage of the capacitor C2 decreases, the current peak of the FET 2 decreases (as indicated by an arrow a).

In step S503, the control signal DS1 having the initial value is output as the PWM signal. The control signal DS2 is output to be at a high level during the low-level period of the control signal DS1, during which the dead time is provided, and to be at a low level during the other period. The gate drive signal DL and the gate drive signal DH are output as the PWM signals based on the control signal DS1 and the control signal DS2.

To bring the output voltage Vout close to the target voltage while preventing an overshoot of the output voltage Vout, the control is performed so that the on-duty ratio of the PWM signal of the control signal DS1 is reduced in step S503 and the on-duty ratio of the PWM signal is gradually increased in step S504. In other words, in step S503, the high-level period of the control signal DS2 is increased to increase the on-period of the FET 2.

If steps S501 and S502 are not performed and a transition to step S503 occurs while keeping the voltage of the capacitor C2 at the high level, the on-period of the FET 2 is long, and thus a large current flows through the FET 2 when the FET 2 is turned on. This raises the need to select an FET with a large current rating as the FET 2.

In contrast, in the present exemplary embodiment, because the voltage of the capacitor C2 is sufficiently low in step S503, the current flowing through the FET 2 is small enough. This makes it possible to use an FET with a small current rating as the FET 2 and thereby reduce the cost of the FET 2. Subsequently, in step S504, the on-duty ratio of the control signal DS1 is gradually increased, so that energy is supplied to the secondary side, and the output voltage Vout is increased to the target voltage. As described above, at the time of starting the generation of the output voltage Vout, the power supply control unit 201 makes the FET 2 conductive for the period shorter than the period in which the FET 2 is made conductive to generate the output voltage Vout. The power supply control unit 201 controls the FET 1 and the FET 2 via the FET drive unit 202, and the FET 2 maintains the non-conductive state until the charge pump circuit is charged to a predetermined voltage regardless of the control by the power supply control unit 201.

In the present exemplary embodiment, in step S502, the voltage of the capacitor C2 is determined to be smaller than the predetermined voltage, based on whether the control signal DS1 and the control signal DS2 are output the predetermined number of times, but the present exemplary embodiment is not limited thereto. For example, a voltage detection circuit can be provided in the capacitor C2 to detect the voltage. Alternatively, utilizing the correlation between the voltage of the capacitor C2 and the discharge current amount, a current detection circuit that detects the current flowing through the capacitor C2 can be provided, and a change in the discharge current amount can be monitored for the determination.

In the present exemplary embodiment, the control signal DS2 is output as the fixed PWM signal in step S501, but present exemplary embodiment is not limited thereto. For example, a voltage detection circuit that detects the voltage of the capacitor C2 can be provided, and the high-level period (the on-period) or frequency of the PWM signal can be changed based on the detected voltage. Because the current of the FET 2 changes depending on the voltage of the capacitor C2, the control signal DS2 can be optimized for each voltage of the capacitor C2 in a range not exceeding the current rating of the FET 2.

The voltage of the capacitor C2 can be thereby lowered fast and safely.

The high-level period (the on-period) or frequency of the control signal DS2 to be output as the PWM signal can be changed based on the VS terminal voltage. The charges stored in the capacitor C2 return to the smoothing capacitor 102 via the transformer T1 in step S501. If the direct-current voltages Vin vary, the discharge periods of the capacitor C2 vary. It is thus possible to lower the voltage of the capacitor C2 fast in a range not exceeding the current rating of the FET 2, by detecting the VS terminal voltage and changing the control signal DS2 based on the detected VS terminal voltage.

In the present exemplary embodiment, steps S501 and S502 are performed immediately before the switching operation begins, but the present exemplary embodiment is not limited thereto. For example, steps S501 and S502 can be performed during a period immediately after the output of the PWM signals is determined to be discontinued in step S507 and before the next switching operation begins.

As described above, according to the present exemplary embodiment, the FET 2 is controlled to be turned on in a short period at the time of starting the switching operation, which makes it possible to reduce the voltage of the capacitor C2 while decreasing the current flowing from the capacitor C2 to the FET 2. In addition, even in a case where the VH terminal voltage desirable for the switching of the FET 2 is insufficient, the FET 1 is turned on while the FET 2 is off, whereby the VH terminal voltage can be charged and the FET 2 can be switched. This makes it possible to use a switching FET with a low current rating as the FET 2 and thereby reduce the cost of the FET 2.

As described above, according to the present exemplary embodiment, a peak value of a current flowing through a switching element at the time of activation of a power supply apparatus is suppressed, whereby a cost attributable to the switching element can be reduced.

<Laser Beam Printer>

Figure 7:
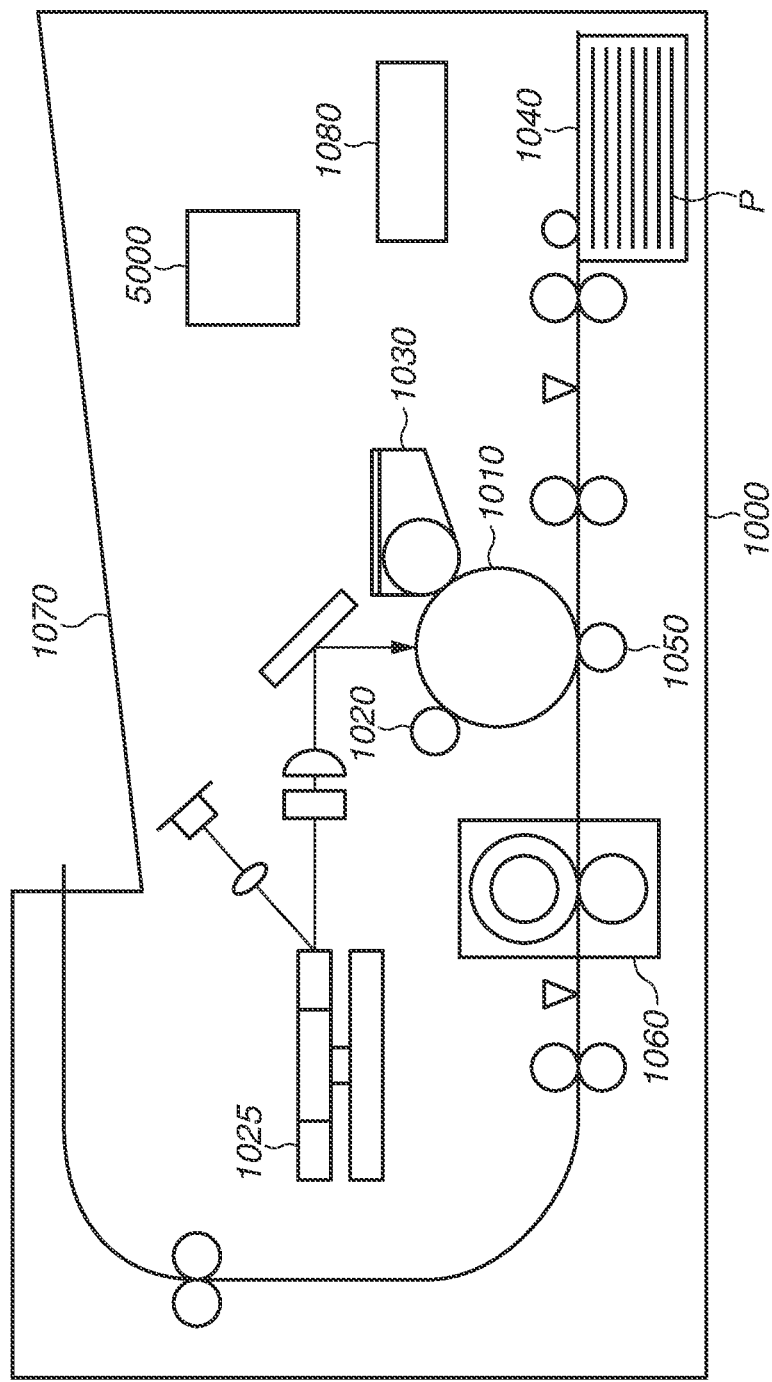
FIG. 7 is a schematic diagram illustrating a laser beam printer according to the third exemplary embodiment.

FIG. 7 illustrates a schematic configuration of a laser beam printer 1000, which is an example of an image forming apparatus according to a third exemplary embodiment. The laser beam printer 1000 (hereinafter referred to as the printer 1000) includes a photosensitive drum 1010, a charging unit 1020, and a developing unit 1030. The photosensitive drum 1010 is an image bearing member on which an electrostatic latent image is to be formed. The charging unit 1020 uniformly charges the photosensitive drum 1010. An optical scanning unit 1025 serving as an exposure unit forms the electrostatic latent image by scanning the photosensitive drum 1010 with laser light corresponding to image data. The developing unit 1030 forms a toner image by developing the electrostatic latent image formed on the photosensitive drum 1010 with toner. The toner image formed on the photosensitive drum 1010 (the image bearing member) is transferred by a transfer unit 1050 onto a sheet P supplied from a cassette 1040 and serving as a recording material, and the toner image transferred to the sheet P, which is in an unfixed state, is fixed to the sheet P by a fixing unit 1060. The sheet P is subsequently output to a tray 1070. The photosensitive drum 1010, the charging unit 1020, the developing unit 1030, and the transfer unit 1050 form an image forming unit. The printer 1000 includes a power supply apparatus 1080, and supplies power from the power supply apparatus 1080 to a drive unit such as a motor and a control unit 5000. The power supply apparatus 1080 includes, for example, the switching power supply 200 according to the first or second exemplary embodiment.

The control unit 5000 includes a CPU (not illustrated), and controls the image forming operation of the image forming unit, the operation of conveying the sheet P, and the like. After a lapse of a predetermined time from the completion of a printing operation, the printer 1000 shifts to a standby state in which the printing operation is ready to be performed.

After a lapse of a further predetermined time, the printer 1000 shifts from the standby state to a sleep state, which is a low power consumption mode, in order to reduce power consumption during standby. The printer 1000 has three states: a printing state which is a first mode, and the sleep state and the standby state which are a second mode. The control unit 5000 shifts the printer 1000 to each of the states. The image forming apparatus to which the switching power supply 200 according to the first or second exemplary embodiment included in the power supply apparatus 1080 can be applied is not limited to the configuration illustrated in FIG. 7.

As described above, according to the third exemplary embodiment, a peak value of a current flowing through a switching element at the time of activation of a power supply apparatus is suppressed, whereby a cost attributable to the switching element can be reduced.

According to the exemplary embodiments of the present disclosure, a peak value of a current flowing through a switching element at the time of activation of a power supply apparatus is suppressed, whereby a cost attributable to the switching element can be reduced.

While exemplary embodiments have been described, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-090064, filed Jun. 2, 2022, which is hereby incorporated by reference herein in its entirety.

What is claimed is:

1. A power supply apparatus comprising:
   a transformer including a primary winding and a secondary winding;
   a first switching element connected to the primary winding in series;
   a second switching element connected to the primary winding in parallel;
   a first capacitor connected to the second switching element in series, and connected to the primary winding in parallel together with the second switching element; and
   a control unit configured to control a switching operation of each of the first switching element and the second switching element by making each of the first switching element and the second switching element conductive or non-conductive,
   wherein the control unit makes the first switching element and the second switching element conductive alternately to generate an output voltage to be output to a secondary side of the transformer,
   wherein, during a period after stopping generation of the output voltage and before resuming the generation of the output voltage, the control unit performs the switching operation of the second switching element in a state where the first switching element is made non-conductive,
   wherein, during the period after stopping the generation of the output voltage and before resuming the generation of the output voltage, the control unit performs the switching operation of the second switching element at least twice, and
   wherein the control unit makes a period during which the second switching element is made conductive after the generation of the output voltage is stopped, shorter than a period during which the second switching element is made conductive before the generation of the output voltage is stopped.

2. The power supply apparatus according to claim 1, further comprising a storage unit configured to store information indicating a relationship between a number of times of the switching operation of the second switching element and a voltage of the first capacitor,
   wherein the control unit determines the voltage of the first capacitor based on the information stored in the storage unit and the number of times of the switching operation of the second switching element, and performs the switching operation of the second switching element until the determined voltage of the first capacitor becomes equal to or less than a predetermined voltage.

3. The power supply apparatus according to claim 1, further comprising a first voltage detection unit configured to detect a voltage of the first capacitor,
   wherein the control unit performs the switching operation of the second switching element until the voltage of the first capacitor detected by the first voltage detection unit becomes equal to or less than a predetermined voltage.

4. The power supply apparatus according to claim 1, further comprising a current detection unit configured to detect a current that flows in a case where the first capacitor is discharged,
   wherein the control unit determines a voltage of the first capacitor based on the current detected by the current detection unit, and performs the switching operation of the second switching element until the determined voltage of the first capacitor becomes equal to or less than a predetermined voltage.

5. The power supply apparatus according to claim 1, further comprising:
   a second capacitor configured to smooth a rectified alternating-current voltage; and
   a second voltage detection unit configured to detect a voltage of the second capacitor,
   wherein the control unit determines a voltage of the first capacitor based on the voltage detected by the second voltage detection unit, and performs the switching operation of the second switching element until the determined voltage of the first capacitor becomes equal to or less than a predetermined voltage.

6. The power supply apparatus according to claim 1, further comprising a first voltage detection unit configured to detect a voltage of the first capacitor,
   wherein, based on the voltage detected by the first voltage detection unit, the control unit changes an on-period of a pulse width modulation (PWM) signal for controlling the second switching element or changes a frequency of the PWM signal.

7. The power supply apparatus according to claim 1, further comprising:
   a rectification smoothing unit configured to rectify and smooth a voltage induced in an auxiliary winding; and
   a first resistance and a second resistance configured to divide the voltage rectified and smoothed by the rectification smoothing unit,
   wherein the transformer includes the auxiliary winding, and
   wherein, based on a voltage obtained by the division by the first resistance and the second resistance, the control unit changes an on-period of a pulse width modulation (PWM) signal for controlling the second switching element or changes a frequency of the PWM signal.

8. A power supply apparatus comprising:
   a transformer including a primary winding and a secondary winding;

a first switching element connected to the primary winding in series;

a second switching element connected to the primary winding in parallel;

a first capacitor connected to the second switching element in series, and connected to the primary winding in parallel together with the second switching element; and a control unit configured to control a switching operation of each of the first switching element and the second switching element by making each of the first switching element and the second switching element conductive or non-conductive, wherein the control unit makes the first switching element and the second switching element conductive alternately to generate an output voltage to be output to a secondary side of the transformer, and wherein, before starting generation of the output voltage, the control unit performs the switching operation of the second switching element by making the second switching element conductive for a period shorter than a period in which the second switching element is made conductive to generate the output voltage.

9. The power supply apparatus according to claim 8, further comprising a drive unit configured to drive the first switching element and the second switching element, wherein the drive unit is charged by conduction of the first switching element, and includes a charge pump circuit for driving the second switching element, wherein the control unit controls the first switching element and the second switching element via the drive unit, and wherein the second switching element remains non-conductive until the charge pump circuit is charged to a predetermined voltage regardless of control by the control unit.

10. The power supply apparatus according to claim 9, further comprising a storage unit configured to store information indicating a relationship between a number of times of the switching operation of the second switching element and a voltage of the first capacitor, wherein the control unit determines the voltage of the first capacitor based on the information stored in the storage unit and the number of times of the switching operation of the second switching element, and performs the switching operation of the second switching element until the determined voltage of the first capacitor becomes equal to or less than a predetermined voltage.

11. The power supply apparatus according to claim 9, further comprising a first voltage detection unit configured to detect a voltage of the first capacitor, wherein the control unit performs the switching operation of the second switching element until the voltage of the first capacitor detected by the first voltage detection unit becomes equal to or less than a predetermined voltage.

12. The power supply apparatus according to claim 9, further comprising a current detection unit configured to detect a current that flows in a case where the first capacitor is discharged, wherein the control unit determines a voltage of the first capacitor based on the current detected by the current detection unit, and performs the switching operation of the second switching element until the determined voltage of the first capacitor becomes equal to or less than a predetermined voltage.

13. The power supply apparatus according to claim 9, further comprising:

a second capacitor configured to smooth a rectified alternating-current voltage; and a second voltage detection unit configured to detect a voltage of the second capacitor, wherein the control unit determines a voltage of the first capacitor based on the voltage detected by the second voltage detection unit, and performs the switching operation of the second switching element until the determined voltage of the first capacitor becomes equal to or less than a predetermined voltage.

14. An image forming apparatus comprising:
a power supply apparatus including:
a transformer including a primary winding and a secondary winding,
a first switching element connected to the primary winding in series,
a second switching element connected to the primary winding in parallel,
a first capacitor connected to the second switching element in series, and connected to the primary winding in parallel together with the second switching element, and
a control unit configured to control a switching operation of each of the first switching element and the second switching element by making each of the first switching element and the second switching element conductive or non-conductive, wherein the control unit makes the first switching element and the second switching element conductive alternately to generate an output voltage to be output to a secondary side of the transformer, wherein, during a period after stopping generation of the output voltage and before resuming the generation of the output voltage, the control unit performs the switching operation of the second switching element in a state where the first switching element is made non-conductive wherein, during the period after stopping the generation of the output voltage and before resuming the generation of the output voltage, the control unit performs the switching operation of the second switching element at least twice, and wherein the control unit makes a period during which the second switching element is made conductive after the generation of the output voltage is stopped, shorter than a period during which the second switching element is made conductive before the generation of the output voltage is stopped.

15. An image forming apparatus comprising:
a power supply apparatus including:
a transformer including a primary winding and a secondary winding,
a first switching element connected to the primary winding in series,
a second switching element connected to the primary winding in parallel,
a first capacitor connected to the second switching element in series, and connected to the primary winding in parallel together with the second switching element, and
a control unit configured to control a switching operation of each of the first switching element and the second switching element by making each of the first switching element and the second switching element conductive or non-conductive, wherein the control unit makes the first switching element and the second switching element conductive alternately to generate an output voltage to be output to a secondary side of the transformer, and wherein, before starting generation of the output voltage, the control unit performs the switching operation of the second switching element by making the second switching element conductive for a period shorter than a period in which the second switching element is made conductive to generate the output voltage.

* * * * *